United States Patent [19]

Elter et al.

[11] Patent Number: 4,725,400

[45] Date of Patent: Feb. 16, 1988

[54] NUCLEAR REACTOR PLANT HOUSED IN A STEEL PRESSURE VESSEL, WITH A GAS COOLED, SMALL HIGH TEMPERATURE REACTOR

[75] Inventors: Claus Elter, Bad Durkheim; Josef Schoening, Hambruecken; Winfried Wachholz, Gorxheimertal; Ulrich Weicht, Weinheim, all of Fed. Rep. of Germany

[73] Assignee: Hochtemperatur-Reaktorbau GmbH, Fed. Rep. of Germany

[21] Appl. No.: 810,243

[22] Filed: Dec. 18, 1985

[30] Foreign Application Priority Data

Dec. 18, 1984 [DE]  Fed. Rep. of Germany ....... 3446141

[51] Int. Cl.⁴ ............................................. G21C 15/18
[52] U.S. Cl. .................................... 376/299; 165/101; 376/298; 376/389; 376/391; 376/406
[58] Field of Search ................. 165/101; 376/243, 281, 376/298, 299, 389, 391, 406, 287

[56] References Cited

U.S. PATENT DOCUMENTS

| | | | |
|---|---|---|---|
| 2,946,732 | 7/1960 | Wootton | 376/389 |
| 3,802,994 | 4/1974 | Förster et al. | 376/299 |
| 4,322,268 | 3/1982 | Amtmann | 376/299 |
| 4,367,194 | 1/1983 | Schenewerk et al. | 376/298 |
| 4,642,214 | 2/1987 | Zhong | 376/381 |

FOREIGN PATENT DOCUMENTS

| | | | |
|---|---|---|---|
| 716521 | 1/1942 | Fed. Rep. of Germany | 165/101 |
| 1934952 | 3/1971 | Fed. Rep. of Germany | 376/391 |
| 2346868 | 8/1973 | Fed. Rep. of Germany | 376/281 |
| 3141892 | 5/1983 | Fed. Rep. of Germany | |
| 3212266 | 6/1983 | Fed. Rep. of Germany | 376/299 |

OTHER PUBLICATIONS

Vaughan, J. Br. Nucl. Energy Soc., 1975, 14, Apr., No. 2, 105–118.

Primary Examiner—Deborah L. Kyle
Assistant Examiner—Richard W. Wendtland
Attorney, Agent, or Firm—Robert J. Koch

[57] ABSTRACT

A nuclear reactor plant housed in a steel pressure vessel with a small high temperature reactor, together with a steam generator arranged over said reactor and with at least two circulating blowers connected in parallel with each other and following the steam generator in line and is provided with a decay heat removal system located in the primary loop. This system is arranged above the steam generator and a shut-off device is provided between the two component. The shut-off device, which may actuated both passively—by difference pressure—and actively, by means of a drive, is designed so that in normal operation no hot gas may enter the decay heat removal system. In the decay heat removal mode the hot gas is conducted into the decay heat removal system and the steam generator is closed off the hot gas. Simultaneously, the cold gas coming from the decay heat removal system is returned through the steam generator or a gas conduit parallel to it, to the reactor core. In the plant according to the invention the operating installations are rigorously separated from the installations serving the removal of decay heat, whereby a high degree of availability is obtained for the decay heat removal system.

18 Claims, 8 Drawing Figures

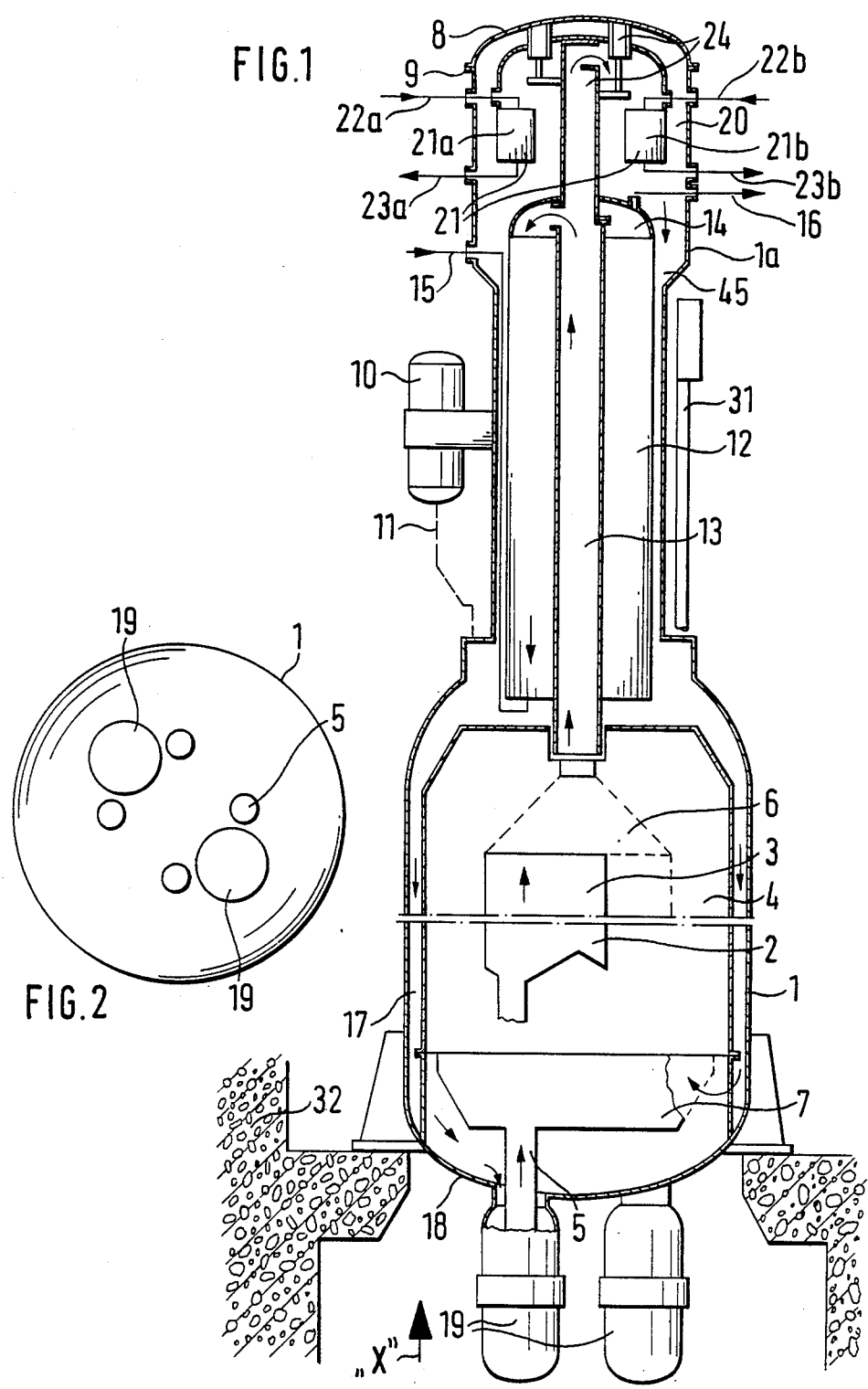

# NUCLEAR REACTOR PLANT HOUSED IN A STEEL PRESSURE VESSEL, WITH A GAS COOLED, SMALL HIGH TEMPERATURE REACTOR

BACKGROUND OF THE INVENTION

1. Field of the Invention

The invention relates to a nuclear reactor installation housed in a steel pressure vessel, with a gas cooled small high temperature reactor. More particularly a reactor where cooling gas flows through a core of spherical fuel elements from bottom to top, with a heat utilization system placed in the flow of cooling gas. The heat utilization system is installed above the small high temperature reactor in the reactor pressure vessel and is followed in line preferably by two circulating blowers. A hot gas conduit is installed centrally through the heat utilization system and leads from a first hot gas collector chamber above the small high temperature reactor to a second hot gas collector chamber located above the heat utilization system, and a decay heat removal system is installed in the steel pressure vessel.

2. Description of the Prior Art

A nuclear reactor installation is described in West German Application DE P No. 34 35 255.4 corresponding to U.S. application Ser. No. 780,260. In this installation the decay heat removal system consists on the primary side, of several decay heat exchangers directly following the principal heat exchangers in line constituting the heat utilization system and are traversed constantly by the entire flow of the cooling gas. The decay heat exchangers are arranged below the principal heat exchanger. On the secondary side the decay heat exchangers are each connected through a decay heat removal water circulation system an external recooling heat exchanger located geodesically higher and connected with a further heat sink, preferably a cooling tower.

For installations with small high temperature reactors, which have in common that the small reactor together with a heat utilization system (steam generator, split tubular furnace, He/He heat exchanger) is installed in a steel pressure vessel, other means and processes were additionally developed for the removal of decay heat.

Thus in West German Application DE P No. 33 45 113.3 corresponding to U.S. application Ser. No. 675,641, a nuclear power plant with a small high temperature reactor is described, wherein the decay heat is removed from the primary loop through the operational steam generators. This process has the disadvantage that the primary steam generators and blowers must have a very high availability or capacity, or upon the failure of the primary steam generators and blowers, installations in the reactor core will be exposed to very high temperatures.

West German Patentschrift DE P No. 32 12 266 and West German Offenlegungsschrift DE-OS No. 311 41 892 shows to actuate an operational concrete cooling system in the case of the failure of the operational steam generators and/or blowers for the removal of decay heat, said concrete cooling safety shell surrounding the steel pressure vessel and operated by natural circulation. The heat is transferred by radiation from the steel pressure vessel installed extensively without thermal insulation to the concrete. These two nuclear reactor plants again pose high requirements in relation to the availability of the primary steam generators and blowers and in case of a failure of these components, both at the core installations designed for cold gas temperatures and in the safety shell high temperatures are experienced.

SUMMARY OF THE INVENTION

A system according to the invention is made up of a nuclear reactor plant with a small high temperature reactor housed in a steel pressure vessel. The core of the reactor comprises a pile of spherical fuel elements, traversed from bottom to top by a cooling gas. A heat utilization system is arranged in the flow of cooling gas, installed above the small high temperature reactor in the reactor pressure vessel and followed in line by at least two circulating blowers. A hot gas conduit is installed centrally through the heat utilization system and leads from a first hot gas collector chamber above the small high temperature reactor to a second hot gas collector chamber above the heat utilization system. A decay heat removal system is installed in the steel pressure vessel above the second hot gas collector chamber. It is an object of the invention to provide a high capacity for removal of decay heat and to protect the heat utilization system in a decay heat removal system and also to protect the heat utilization system in a decay heat removal operation against thermal overloads. The heat utilization system, including its auxiliary systems, should be laid out simply and expediently.

The attainment of this object is characterized according to the invention, by the following elements:

(a) the utilization system comprises a steam generator operated by vertical evaporation;

(b) the decay heat removal system is arranged in a part of the pressure vessel located directly above the second hot gas collector chamber;

(c) between the steam generator and the decay heat removal system a shut-off device is provided, to perform the following functions:

(aa) in normal operation it shuts off the decay heat removal system against the second hot gas collector space, (bb) in a decay heat removal operation it opens the connection between the decay heat removal system and the second hot gas collector chamber and shuts off the steam generator from the hot gas, (cc) again in the decay heat removal operation it opens the passage of the cold gas exiting from the decay heat removal system to the steam generator or to a gas conduit located parallel to the steam generator;

(d) the circulating blowers located in the flow of cold gas are connected parallel with respect to each other, in a known manner.

In a nuclear reactor plant according to the invention a rigorous separation of the operating installations from the safety engineering installations for the removal of decay heat is effected, whereby a relatively higher availability is obtained for the decay heat removal system proper. In addition, the components and systems dimensioned and designed for power operation may be laid out simply and expediently, together with their auxiliary systems. This not only has a favorable economic effect on the cost of the components itself, but also on the costs of the building required for the components, as it is not necessary to design the latter against external effects (earthquakes, aircraft crashes).

The placing of the decay heat removal system in the primary loop assures the direct removal of the decay heat without thermally loading the core installations and the steam generator designed for cold gas temperatures, which in case of the actuation of the decay heat removal system follows the latter in line. It is possible further to shut down the steam generator by means of the separate decay heat removal system in case of a leakage of the steam generator, without prior localization of the damage. The decay heat removal system, which constantly is in a hot-stand-by operation, is continuously monitored for leakage and is therefore self-announcing.

Normally, decay heat is removed by existing installations, in the present case by rapid removal through the steam generator and the operation external heat sink. Only when these installations fail is the decay heat removal system actuated. If the small high temperature reactor is under pressure, the hot gas is passed by natural convection through the central hot gas conduit to the decay heat removal system, where it cools down and enters the steam generator or the parallel gas conduit, respectively. After passing through the steam generator or the parallel gas conduit, the gas arrives in a cold gas collector chamber and is returned to the reactor core from below. The shut-off device operates in this case in the manner described above: the hot gas is shut off from the steam generator and is able only to enter the decay heat removal system. The circulating blower are able to function, and may also be used in the decay heat removal operation. Special circulating blowers for the decay heat removal system are not required and therefore are not provided.

A pressure release accident is such an unlikely event that there is no requirement to combine it with a simultaneous failure of the two circulating blowers connected in parallel (probability of occurrence: $10^{-4}/a \times 10^{-3}/a = 10^{-7}/a$). Possible modes of the removal of decay heat which even then remain available shall be described later. The feasibility of passive decay heat removal is thus assured in the case of any accident.

Advantageous further features of the invention are set forth in the description below of the schematic drawings.

The problem upon which the invention is based may be solved by an alternative embodiment wherein the heat utilization system comprises a steam generator operated by vertical evaporation, the decay heat removal system is arranged in a part of the pressure vessel located directly above the second hot gas collector chamber and is supplied with hot gas by a continuation of the hot gas conduit beyond the second hot gas collector space, and the heat generated in the decay heat removal system in normal operation is utilized for the preheating of the feed water for the steam generator. This embodiment operates in the same basic installation a single steam generator and a decay heat removal system placed above it in the steel pressure vessel. However, in this case no shut-off device is provided between the steam generator and the decay heat removal system, whereby the heat obtained in normal operation is preferably utilized for the preheating of the feed water of the steam generator.

BRIEF DESCRIPTION OF THE DRAWINGS

The Figures, all of which relate to the solution described initially, show the following individually:

FIG. 1 shows a longitudinal section through a first embodiment;

FIG. 2 shows view "X" of FIG. 1;

DETAILED DESCRIPTION OF THE PREFERRED EMBODIMENT

Figures 3, 4:
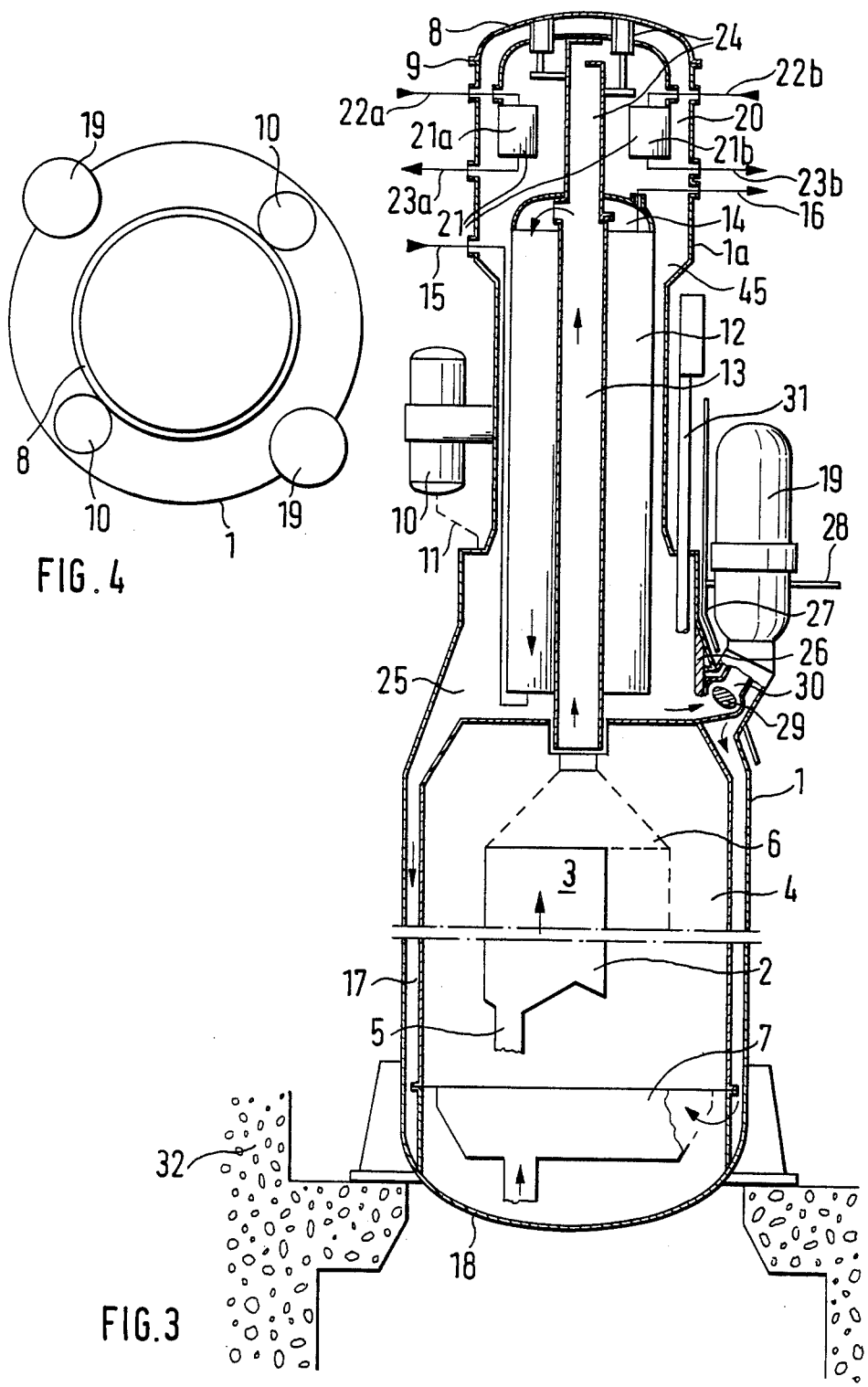
FIG. 3 shows a longitudinal section through a second embodiment.
FIG. 4 shows a top view of the installation of FIG. 3.

FIG. 1 shows a steel pressure vessel 1 with a cylindrical cross section and whose upper part is drawn or elongated. A small high temperature reactor 2 is installed in the lower part, the core 3 whereof comprises a pile of spherical fuel elements. The pile is surrounded on all sides by a graphite reflector 4. The fuel elements are removed from the core 3 by four pebble extraction tubes 5 (see also FIG. 2). The fuel elements are introduced from above (not shown). The cooling gas, helium, flows through the fuel element pile from the bottom to top. A first hot gas collector chamber 6 is located directly above the core 3. A cold gas collector chamber 7 is provided under the bottom part of the reflector 4.

A vaulted cover 8 is set onto the drawn-in upper part 1a of the steel pressure vessel, which is secured by means of a flange connection 9. Around the part 1 a plurality of control and shutdown rods 31 is arranged on a graduated circle with a diameter smaller than that of the steel pressure vessel 1, said rods being capable of being inserted into the reflector 4. In the drawn-in area 1a, two reservoirs 10 are mounted on the outside of the steel pressure vessel 1, for small absorber pebbles. The absorber pebbles, which may be inserted through the lines 11 into the core 3, also serve to control and shut down the small high temperature reactor 2.

A heat utilization system is located in the drawn-in part 1a of the vessel. In the present case a steam generator 12 is operated by vertical evaporation. It is circular in cross section and surrounds a central hot gas conduit 13. The latter connects with the first hot gas collector chamber 6 and enters a second hot gas collector chamber 14 provided above the steam generator. In the hot gas collector chamber 14 the upward flowing hot gas is deflected in normal operation and conducted to the steam generator 12. Feed water is supplied to the steam generator 12 by a line 15, while the live steam is removed through a line 16.

An annular gap 17 is located between the steel pressure vessel 1 and the graphite reflector 4 through which the cold helium is conducted downward to the bottom 18 of the vessel 1, where it is distributed over two circulating blowers 19 connected in parallel and mounted on the outside, at the bottom 18. The circulating blowers 19 move the cold helium into the cold gas collector chamber 7, from which it re-enters the core 3.

In a part 20 of the pressure vessel located directly above the steam generator 12, a decay heat removal system 21 is installed; it comprises a heat exchanger tube bundle. This tube bundle is constructed so that it comprises of two subsystems 21a and 21b, which are supplied separately and therefore are equipped with separate supply lines 22a and 22b, respectively, for feed water and drain lines 23a and 23b for the heated water. The two subsystems 21a and 21b are in a hot stand-by state during normal operation and are therefore monitored continuously for leakage. Each of the two subsystems 21a and 21b is designed to be able to remove all of the decay heat.

Between the steam generator 12 and the decay removal system 21 a shut-off device 24 is arranged, which is shown in FIG. 1 and 3 in a highly schematic manner only. The shut-off device is mounted inside on the cover 8 and has a hollow cylinder shaped slide, which in normal operation shuts the heat utilization system 21 against the second hot gas collector chamber 14, but does not interfere with the passage of hot gas to the steam generator 12. This process is shown both in FIG. 1 and FIG. 3, in the upper left part.

In case the decay heat removal system is actuated, as shown in the aforementioned figures, in the upper right part, the steam generator 12 is closed off from the hot gas line 13, and the access to the decay heat removal system is opened up, so that hot gas flows through the two subsystems 21a and 21b. After cooling down in these two systems the helium enters a gas conduit (45) arranged parallel to the steam generator, so that no gas flows through the steam generator 12 during the decay heat removal operation. The cold helium flows from the gas conduit 45 into the annular gap 17 and then over the same path as in normal operation back to the core 3.

In the case of a small high temperature reactor 2 under pressure, the hot helium flows by natural convection through the hot gas line 13 to the decay heat removal system 21. The secondary loop of the decay heat removal system is supplied again by natural convection by cooling water reservoirs located at a higher elevation (not shown). On the primary side, the circulating blowers 19 may also be used. The decay heat removal system 21 is designed for 200% capacity; the helium may be circulated both by natural convection and the two circulating blowers 19. The two circulating blowers are connected in parallel, and are redundant in that one would be adequate.

In FIGS. 3 and 4 a nuclear reactor plant according to the invention is shown, which differs for the abovedescribed embodiment installation only by the arrangement of the two circulating blowers 19. The two blowers, again connected in parallel, are mounted laterally in the steel pressure vessel 1, in the area of the drawn-in part 1a. The circulating blowers 1a are protected by the shields 26, 27, and 28 with respect to the steel pressure vessel 1. Additional shielding in the form of a displacer body 29 is provided in each of the two blower inlets 30. The nuclear reactor plant comprises a second cold gas collector chamber 25, from which the cold gas is conducted by means of special guides at first to the circulating blowers 19, prior to arriving through the annular gap 17 in the first cold gas collector chamber 7 at the lower end of the core 3.

The nuclear reactor plant according to FIG. 1 or FIG. 3 may be surrounded by a biological shield of concrete. Only the foundation 32 of the biological shield is shown in FIGS. 1 and 3. This shield represents the safety shell of the nuclear reactor plant and is equipped with a concrete cooling system operated by natural convection. The concrete cooling system may be employed additionally for the removal of the decay heat, where the safety shell is exposed to thermal loads.

In the installation according to the invention the concrete system is actuated only in the hypothetical case of the occurrence of the pressure release accident, together with the simultaneous failure of both of the circulating blowers 19. In this extremely unlikely case the decay heat is removed through the concrete cooling system, without the need for active measures of any kind.

Figure 5:
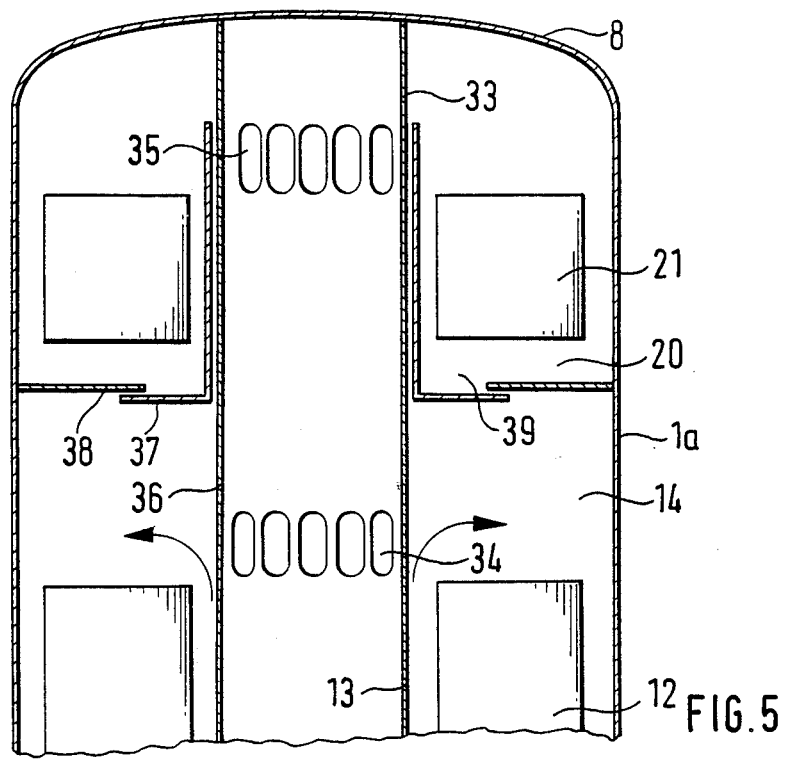
FIG. 5 shows second example of a shut-off device, enlarged, during normal operation.
Figure 6:
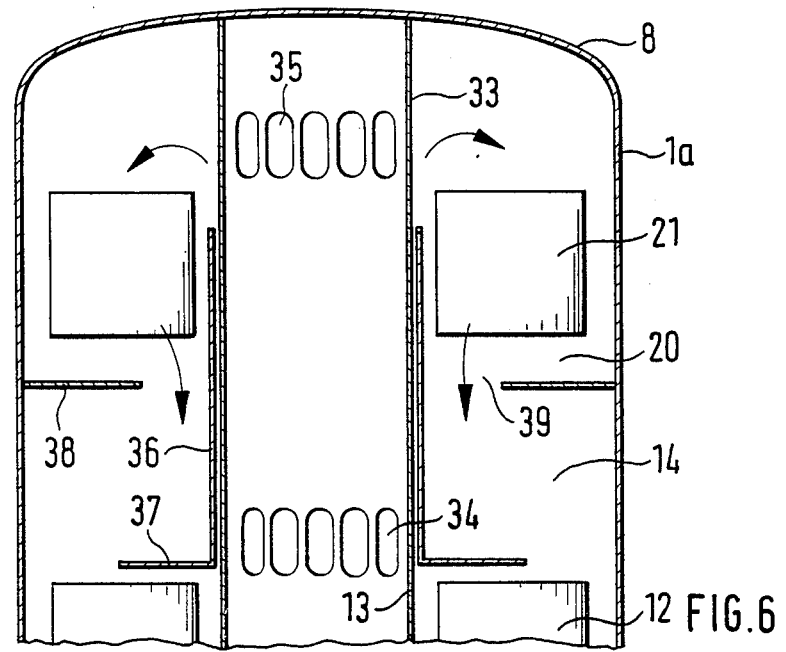
FIG. 6 shows shut-off device of FIG. 5 in decay heat removal operation.

FIGS. 5 and 6 shows a first variant of embodiment of a shut-off device. It comprises a stationary hollow cylinder 33, connected with the hot gas conduit 13 and comprising two rows 34, 35 of gas slits, together with a hollow cylinder-like slide 36 displaceable on the hollow cylinder 33, an annular cover part 37 mounted on the lower end. The first row 34 of the gas slits is located within the area of the second hot gas collector chamber 14, while the second row 35 is provided in the area above the decay heat removal system 21. The upper part 20 of the pressure vessel containing the decay heat removal system 21 is closed off toward the second hot gas collector chamber 14 by a partition 38 comprising an annular passage 39. This passage may be closed by the cover part 37.

FIG. 5 shows the slide 36 in its upper position, wherein it covers the second row 35 of the gas slits and closes the annular passage 39. Hot gas is now able only to pass through slits 34 into the second hot gas collector chamber 14 and from there into the steam generator 12. The slide 36 occupies this position in normal operation. In FIG. 6 the slide occupies its lower position. The gas slits of the first row 34 are thereby covered and those of the second row 35 uncovered. Hot gas is now able to flow only through slits 35 into the decay heat removal system 21. Simultaneously, the passage 39 is opened and the cooled gas may flow to the steam generator 12. This slide position is present when the installation is operating in its decay heat removal mode.

Figure 7:
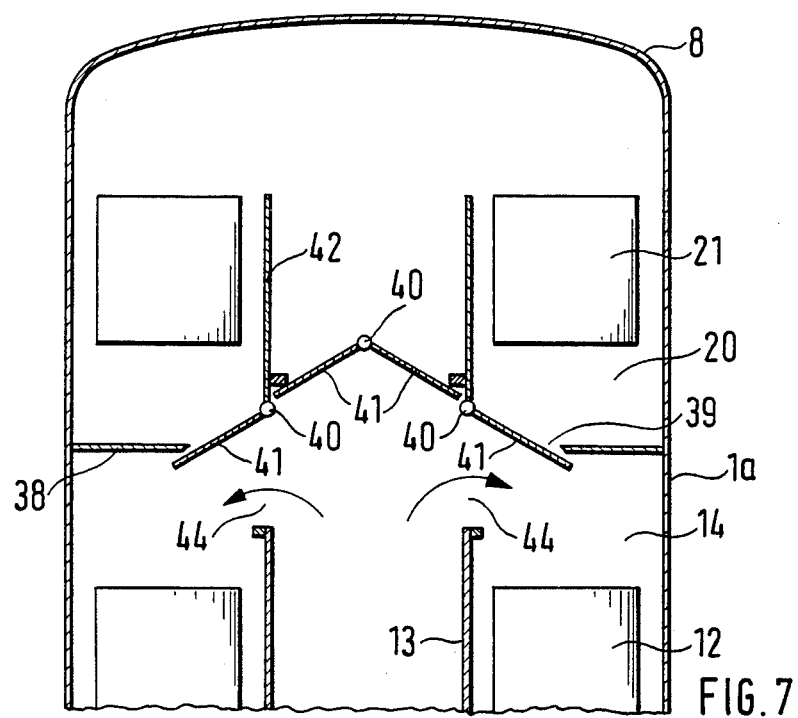
FIG. 7 shows a third example of a shut-off installation, in an enlarged view, in normal operation.
Figure 8:
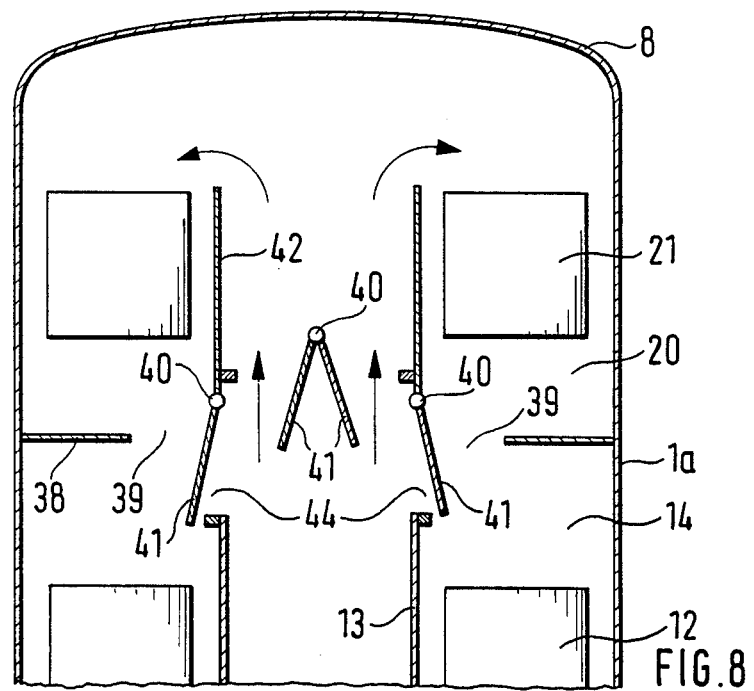
FIG. 8 shows the shut-off installation of FIG. 7 in decay heat removal operation.

In an alternative embodiment of the shut-off device shown in FIG. 7 and 8, a plurality of flaps 41 are provided pivotable around an axle 40. Part of the flaps 41 are arranged in a central channel 42 connected with the hot gas conduit 13, in a manner such that they are able to cover the entire cross section of the channel. Here again a partition 38, equipped with orifices 1a for the passage of cold gas, is located between the upper part 20 of the pressure vessel and the second hot gas collector chamber 14. Additional flaps 41 are arranged in the jacket of the central channel 42, in a manner such that they close either the orifices 1a or the passages 44 present in the jacket.

The position of the flaps shown in FIG. 7 is present in normal operation: the hot gas is shut off from the decay heat removal system 21 and may enter the steam generator 12 only.

In FIG. 8 the position of the flaps is shown for decay heat removal operation. The flaps 41 located in the central channel 42 are open and permit the passage of hot gas to the decay heat removal system. The flaps located in the jacket of the central channel 42 occupy a position in which the orifices 1a are opened for the passage of cold gas. The steam generator 12 is shut off from the hot gas.

Both the shut-off devices according to FIGS. 5 and 6 and according to FIGS. 7 and 8, may be actuated passively, by means of differential pressure, or actively by a drive.

What is claimed is:

1. A nuclear reactor plant comprising:

a small high temperature reactor housed in a steel pressure vessel, the reactor having a core containing a pile of spherical fuel elements traversed from bottom to top by a flow of cooling gas;

a heat utilization system arranged in said flow of cooling gas, installed above said small high temperature reactor and in said reactor pressure vessel and followed in line by at least two circulating blowers connected in parallel;

a hot gas conduit installed centrally through said heat utilization system and leading from a first hot gas collector chamber above said small high temperature reactor to a second hot gas collector chamber above said heat utilization system;

a decay heat removal system installed in said steel pressure vessel, wherein:

(a) said heat utilization system comprises a steam generator operated by vertical evaporation;

(b) said decay heat removal system is arranged in a part of said pressure vessel located directly above said second hot gas collector chamber;

(c) a shut-off means between said steam generator and said decay heat removal system for:

(aa) closing a decay heat removal system against said second hot gas collector chamber in normal operation;

(bb) in the decay heat removal mode, opening a connection between said decay heat removal system and said second hot gas collector chamber and shutting off said steam generator from the hot gas; and (cc) opening a passage for cold gas exiting from said decay heat removal system to said steam generator or to a gas conduit located parallel to said steam generator in said decay heat removal mode.

2. A nuclear reactor plant according to claim 1, wherein the decay heat removal system further comprising a heat exchanger tube bundle made up of two subsystems wherein each subsystem is supplied individually and has a capacity sufficient to effectuate complete heat removal.

3. A nuclear reactor plant according to claim 2, further comprising several geodesically higher located cooling water reservoirs for supplying the decay heat removal system with cooling water side by natural convection.

4. A nuclear reactor plant according to claim 1, further comprising several cooling water reservoirs for supplying the decay heat removal system with cooling water by natural convection.

5. A nuclear reactor plant according to claim 1, wherein the circulating blowers are arranged under the steel pressure vessel.

6. A nuclear reactor plant according to claim 1, wherein the steel pressure vessel has an upper part which contains a steam generator, the circulating blowers are mounted laterally on the steel pressure vessel with blower inlets located where the upper part meets a lower part of the pressure vessel;

the reactor plant further comprising radiation shields between the steel pressure vessel and each of the circulating blowers, and in the blower inlets.

7. A nuclear reactor plant according to claim 1, further comprising a concrete biological shield with a concrete cooling system operated by natural convection surrounding the steel pressure vessel.

8. A nuclear reactor plant according to claim 1, wherein the shut-off device is designed so that it may be actuated both passively and actively.

9. A nuclear reactor plant according to claim 8, wherein the shut-off device comprises a stationary hollow conduit in communication with said hot gas conduit and having two rows of slits for the passage of gas, a slide displaceable on said hollow conduit, wherein the first row of slits is provided in the area of the second hot gas collector space and the second row of slits in the area above the decay heat removal system; and that on the lower end of the slide, an annular cover is mounted to close a passage leading from an upper area of the vessel to the second hot gas collector chamber.

10. A nuclear reactor plant according to claim 8 wherein the shut-off device comprises a plurality of flaps pivotable around an axle, with part of said flaps being arranged in a central channel leading to the decay heat removal system and closing or opening said channel and another part located in a jacket of the central channel in fluid communication with said hot gas conduit and in one position closing the hot gas conduit against the second hot gas collector chamber thereby opening a passage from an upper area of the vessel to the second hot gas collector chamber, while in a second position opening a connection between the hot gas conduit and the second hot gas collection chamber, and closing the passage.

11. A nuclear reactor plant according to claim 8, wherein a pressure difference of the circulating blowers, or if a hydraulic drive is used, of the feed water circulation is used for the passive actuation of the shut-off device.

12. A nuclear reactor plant according to claim 11, wherein the shut-off device comprises a stationary hollow conduit connected with said hot gas conduit and having two rows of slits for the passage of gas, and a slide displaceable on said hollow conduit, wherein the first row of slits is provided in the area of the second hot gas collector space and the second row of slits in the area above the decay heat removal system and that on the lower end of the slide an annular cover part is mounted to close a passage leading from an upper area of the vessel to the second hot gas collector chamber.

13. A nuclear reactor plant according to claim 11, wherein the shut-off device comprises a plurality of flaps pivotable around an axle. with part of said flaps being arranged in a central channel leading to the decay heat removal system and closing or opening said channel and another part located in a jacket of the central channel connected with the hot gas conduit and in one position closing the hot gas conduit against the second hot gas collector chamber thereby opening a passage from an upper area of the vessel to the second hot gas collection chamber while in a second position opening a connection between the hot gas conduit and the second hot gas collector chamber, and closing the passage.

14. A nuclear reactor plant according to claim 8, further comprising a mechanically, hydraulically or pneumatically controlled drive provided for the active actuation of the shut-off device.

15. A nuclear reactor plant according to claim 14, wherein the shut-off device comprises;

a stationary hollow cylinder connected with the hot gas line and having two rows of slits for the passage of gas; and a slide displaceable on said hollow cylinder wherein the first row of slits is provided in the area of the second hot gas collector space and the second row of slits in the area above the decay heat removal system and that on the lower end of the slide an annular cover part is mounted to close a passage leading from an upper area of the vessel to the second hot gas collector chamber.

16. A nuclear reactor plant according to claim 14, wherein the shut-off device comprises a plurality of flaps pivotable around an axle, with part of said flaps being arranged in a central channel leading to the decay heat removal system and closing or opening said channel and another part located in a jacket of the central channel connected with the hot gas conduit and in one position closing the hot gas conduit against the second hot gas collector chamber thereby opening a passage from an upper area of the vessel to the second hot gas collector chamber while in a second position opening a connection between the hot gas conduit and the second hot gas collection chamber, and closing the passage.

17. A nuclear reactor plant comprising:
a steel pressure vessel with a gas cooled small high temperature reactor, said reactor having a core containing a pile of spherical fuel elements traversed from bottom to top by a flow of cooling gas;
a heat utilization system located in said flow of cooling gas, installed above said small high temperature reactor, in said reactor pressure vessel, and followed in line by two circulating blowers;
hot gas conduit installed centrally through said utilization system and leading from a first hot gas collector chamber above said small high temperature reactor to a second hot gas collector chamber above said heat utilization system;
a decay heat removal system installed in said steel pressure vessel, wherein:
  (a) said heat utilization system comprises a steam generator operated by vertical evaporation;
  (b) said decay heat removal system is arranged in a part of the pressure vessel located directly above said second hot gas collector chamber and is supplied with hot gas by means of a continuation of said hot gas conduit beyond said second hot gas collector space;
and further comprising means for utilizing heat generated in said decay heat removal system in normal operation for preheating feed water for said steam generator connected to the decay heat removal system.

18. A method of removing heat from a nuclear reactor plant said plant comprising:
a small high temperature reactor housed in a steel pressure vessel, said reactor having a core traversed from bottom to top by a flow of cooling gas;
a first hot gas collector chamber above said small high temperature reactor;
a hot gas conduit leading upwards from said first hot gas collector chamber to a second hot gas collector chamber;
a heat utilization system comprising a steam generator operated by vertical evaporation arranged in said flow of cooling gas above the reactor, below said second hot gas collector chamber, and in said reactor pressure vessel, wherein said hot gas conduit passes centrally through said heat utilization system which is followed in line by at least two circulating blowers connected in parallel;
a decay heat removal system located above said second hot gas collector chamber and in said pressure vessel; and
means for selectively shutting off said flow of cooling gas from said decay heat removal system, said method comprising:
in normal operation, closing off said decay heat removal system from the second hot gas collector chamber;
in a decay heat removal mode, opening an input of said decay heat removal system to said second hot gas collector chamber thereby shutting off said steam generator for hot gas, and opening a passage for cold gas exiting said decay heat removal system to said steam generator or a gas conduit located parallel to said steam generator.

* * * * *